United States Patent [19]
Kishi

[11] Patent Number: 5,315,219
[45] Date of Patent: May 24, 1994

[54] DRIVING CIRCUIT FOR DIRECT-CURRENT (DC) MOTOR

[75] Inventor: Jun Kishi, Tokyo, Japan
[73] Assignee: NEC Corporation, Tokyo, Japan
[21] Appl. No.: 23,101
[22] Filed: Feb. 26, 1993
[30] Foreign Application Priority Data Feb. 26, 1992 [JP] Japan .................................. 4-039814

[51] Int. Cl.⁵ .............................................. H02P 5/168
[52] U.S. Cl. ................................. 318/254; 388/815; 318/138
[58] Field of Search ............... 318/138, 139, 254, 439, 318/701, 135; 388/815; 310/27

[56] References Cited

U.S. PATENT DOCUMENTS

| | | | |
|---|---|---|---|
| 4,163,911 | 8/1979 | Simes et al. | 310/27 |
| 4,513,362 | 2/1985 | Welburn | 318/135 |
| 4,616,153 | 10/1986 | Lee | 318/138 |
| 4,943,760 | 7/1990 | Byrne et al. | 318/701 |

Primary Examiner—William M. Shoop, Jr.
Assistant Examiner—John W. Cabeca

[57] ABSTRACT

A motor driving circuit capable of controlling a motor speed by a current controlled method using negative impedance is constituted by a constant-current circuit, a reference voltage generating circuit, a comparator circuit, an output driving circuit, a symmetric current circuit, and a switching circuit. The reference voltage generating circuit outputs a voltage of a value derived from addition of a reference voltage and a voltage proportional to a value of a current flowing to a motor. The comparator circuit compares a voltage outputted from the reference voltage generating circuit and a voltage at an output terminal. The output driving circuit amplifies an output of the comparator circuit. The symmetric current circuit amplifies the output from the output driving circuit. The switching circuit performs switching of connections of one of transistors in the symmetric current circuit between the input of the reference voltage generating circuit and the output terminal, and can release the motor from a normal state of operation upon starting the motor. Thus, it is possible to achieve sufficient torque during the starting operation of the motor.

4 Claims, 7 Drawing Sheets

DRIVING CIRCUIT FOR DIRECT-CURRENT (DC) MOTOR

BACKGROUND OF THE INVENTION

1. Field of the Invention

The Present invention relates to a motor driving circuit, and more Particularly to a current controlled type motor driving circuit in which the starting characteristics of a speed control circuit are improved by the control of negative impedance.

2. Description of the Related Art

Figure 1:
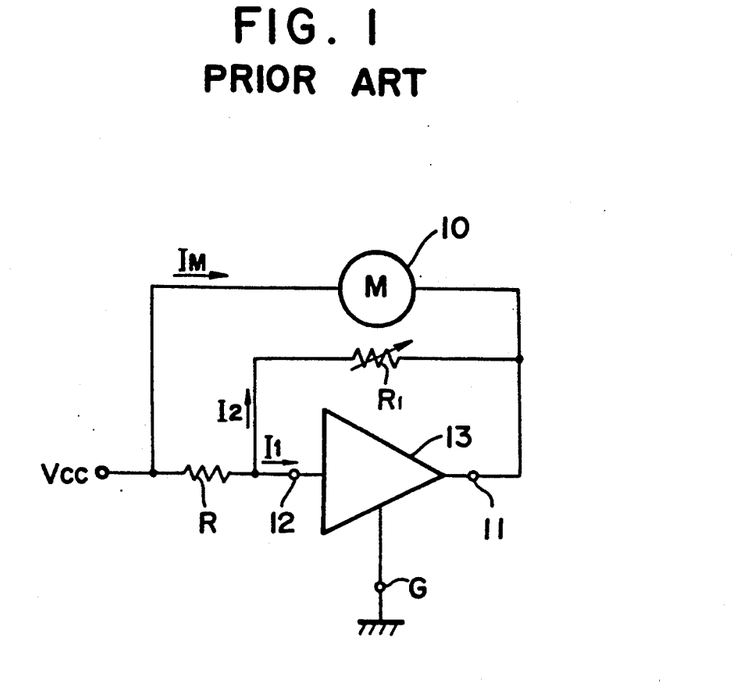
FIG. 1 is a circuit diagram showing an example of a conventional motor driving circuit.

A conventional motor driving circuit of the kind to which the present invention relates is, as shown in FIG. 1, one in which the motor speed Is controlled by a current controlled method using negative impedance. As shown in FIG. 1, in the conventional motor driving circuit, a power supply source Vcc is connected to one input terminal of the motor 10 to be controlled and an output terminal 11 of a control circuit 13 is connected the other input terminal thereof; the power supply source Vcc is also connected to one end of a resistor R; the other end of the resistor R is connected to one end of a variable resistor $R_1$ and also to a reference voltage input terminal 12 of the control circuit 13; and the other end of the variable resistor $R_1$ is connected to the output terminal 11 of the control circuit 13 and also the other input terminal of the motor 10.

The potential difference across the two input terminals of the motor 10 is controlled so as to be made equal to a voltage which is the sum of a voltage drop $V_R$ developed across the register R and a reference voltage produced by a reference voltage generating circuit provided in the control circuit 13. The voltage drop $V_R$ can be accounted for by the product of a resistance R and a current which is the sum of the current $I_1$ flowing into the control circuit 13 and a current $I_2$ of a value resulting from the division of the reference voltage produced by the reference voltage generating circuit provided in the control circuit 13 by the resistor $R_1$. That is, the control circuit 13 detects changes in a counterelectromotive force of the motor due to changes in the rotation number caused by the load changes on the motor 10 and compares the detected changes with the reference voltages. The difference thus obtained causes the value of the current flowing to the reference voltage input terminal 12 to be changed and the voltage drop $V_R$ to be changed. Thus, the potential difference across the two terminals of the motor 10 changes correspondingly with the load changes and the number of revolutions of the motor 10 is kept constant.

If the load on the motor 10 increases, the current $I_M$ which flows to the motor increases and also the current $I_1$ which flows to the control circuit 13 correspondingly increases. This results in an increase in the voltage drop $V_R$ at the resistor R as the potential difference across the two terminals of the motor 10 increases. Thus, the motor 10 can attain a rotation torque that is sufficiently strong to overcome the increase in the load torque and can rotate steadily.

Figure 2:
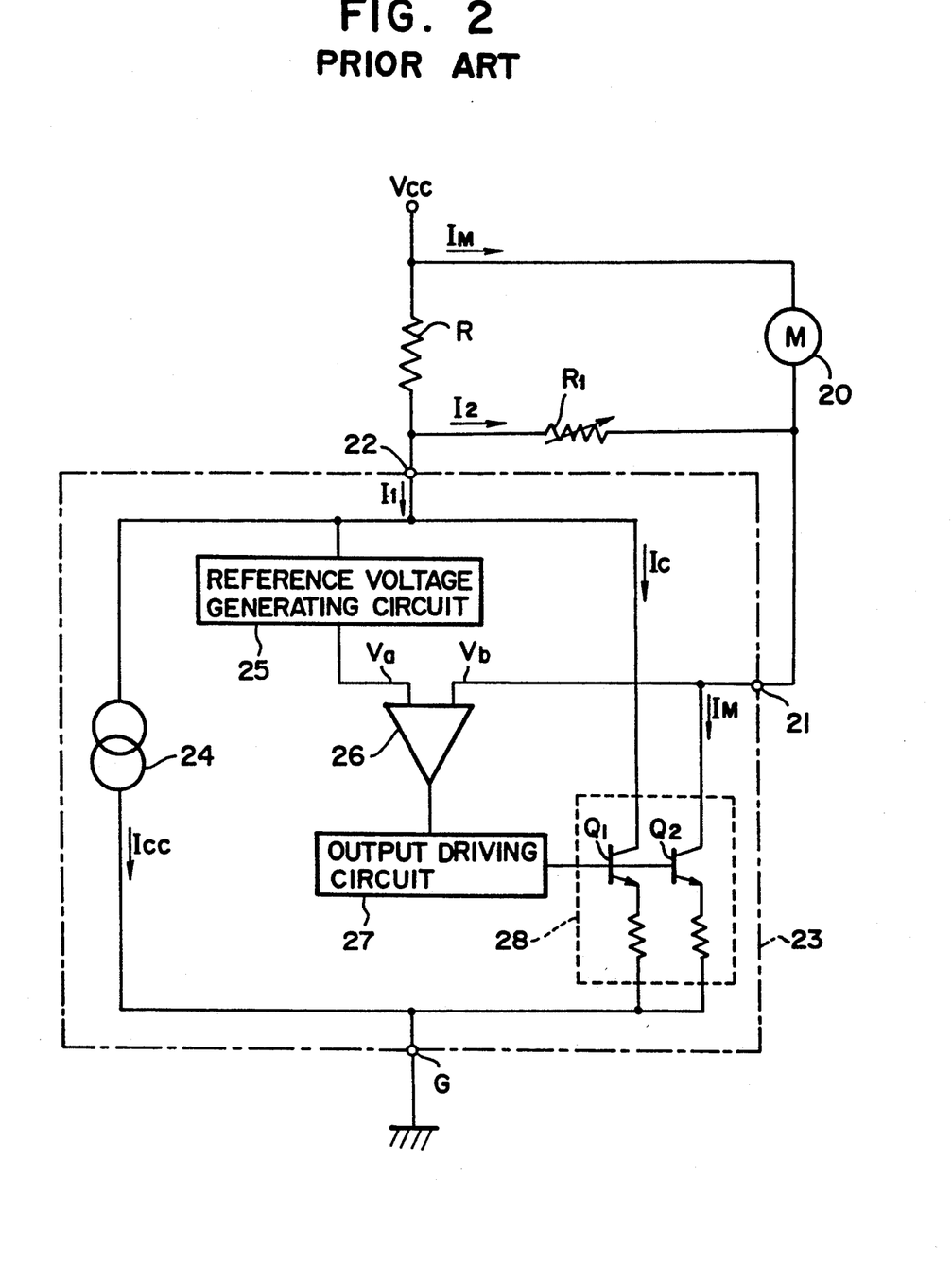
FIG. 2 is a circuit diagram showing in detail the conventional motor driving circuit shown in FIG. 1.

Now, the details of a conventional motor driving circuit are explained. FIG. 2 is a circuit diagram showing a conventional motor driving circuit of a type in which negative impedance is used to control a current which in turn controls the speed of a motor. The conventional motor driving circuit shown in FIG. 2 is constituted by a control circuit 23 blocked in dashed lines, a resistor R and a variable resistor $R_1$. The control circuit 23 is constituted by a constant-current circuit 24, a reference voltage generating circuit 25, a comparator circuit 26, an output driving circuit 27, and a symmetric current circuit 28. The symmetric current circuit 28 is constituted by a transistor $Q_1$ and a transistor $Q_2$.

The reference voltage produced by the reference voltage generating circuit 25 and the voltage drop across the resistor R connected to the reference voltage input terminal 22 are summed together to give a reference voltage potential Va. The comparator circuit 26 compares this potential Va with the output terminal potential Vb which is a voltage at the output terminal 21 of the control circuit 23. The output of the comparator circuit 26 is inputted to and amplified at the output driving circuit 27. The output of the output driving circuit 27 is then inputted to the symmetric current circuit 28. The symmetric current circuit 28 is formed by a current mirror circuit constituted by the transistor $Q_1$ and $Q_2$.

First, the operation of the motor under normal conditions, that is, in the state in which the motor rotation is under control, is explained. At the comparator circuit 26, the reference voltage potential Va and the output terminal potential Vb are compared and the obtained result is inputted to one of the input terminals of the motor 20 through the output driving circuit 27 and the symmetric current circuit 28 and is also inputted to the comparator circuit 27 as the output terminal potential Vb. Thus, the comparator circuit 26, the output driving circuit 27 and the symmetric current circuit 28 constitute a closed loop circuit, which maintains a constant potential difference across the two input terminals of the motor 20 and keeps the rotation of the motor 20 constant.

Figure 3A:
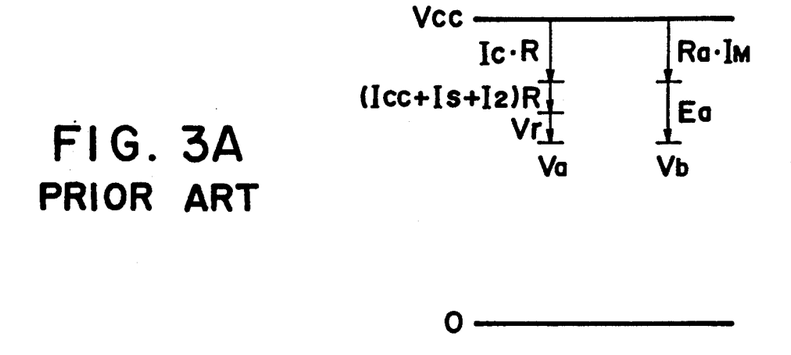
FIGS. 3A, 3B and 3C are explanatory diagrams showing the relationship between potentials at various points of the conventional motor driving circuit shown in FIG. 2.
Figure 3B:
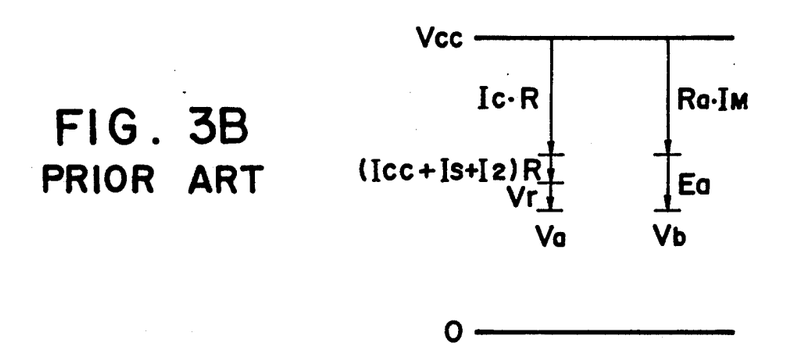
Figure 3C:
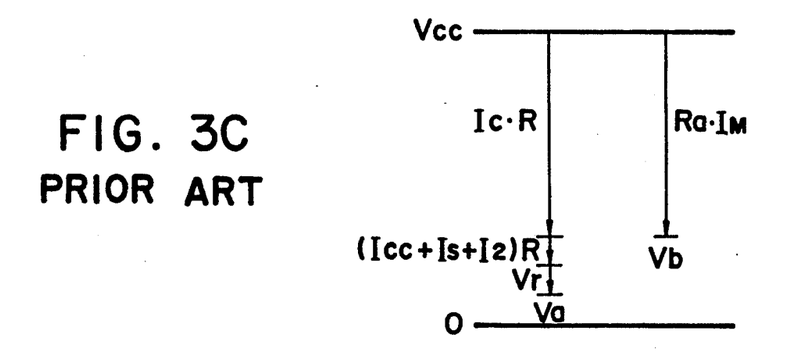

FIGS. 3A, 3B and 3C are explanatory diagrams showing the relationship between potentials at various points in the motor driving circuit shown in FIG. 2. FIG. 3A shows the relationship between potentials at various points in the control circuit 23 when the load on the motor 20 is light. In this condition, the symmetric current circuit 28 causes the current Ic proportional to the current $I_M$ flowing to the motor to flow to the resistor R through the reference voltage input terminal 22 of the control circuit 23, thereby balancing the reference voltage potential Va and the output terminal potential Vb which are the potentials at the two input terminals of the comparator circuit 26. In FIGS. 3A, 3B and 3C, $Ra.I_M$ indicates a voltage drop due to the internal resistance Ra of the motor 20; Ea indicates the counterelectromotive force of the motor 20; Ic.R is the voltage drop at the resistor R when the current in the resistor R is set to a value equivalent to the current in the internal resistor Ra of the motor 20; $(Icc + Is + I_2)R$ indicates a voltage drop across the resistor R due to the currents which flow from the reference voltage input terminal 22 to the constant-current circuit 24, the voltage reference circuit 25 and the variable resistor R1; and Vr indicates a reference voltage outputted from the reference voltage generating circuit 25.

FIG. 3B shows the relationship between potentials at various points in the control circuit 23 when the load on the motor 20 is heavy. In this situation, although the current $I_M$ flowing to the motor increases with an increase in the voltage drop $Ra.I_M$ across the internal resistance Ra of the motor 20, the resistor R is proportional to the internal resistance Ra of the motor 20 and the voltage drop across the resistor R also increases.

Consequently, as the load on the motor 20 becomes heavier, the control circuit 23 detects the current flowing to the motor thereby increasing the voltage drop across the resistor R and also increasing the potential difference across the two terminals of the motor 20. In this way, the rotation of the motor 20 is kept constant irrespective of the magnitude of the load on the motor.

FIG. 3C shows the relationship between potentials at various points in the control circuit 23 at the starting of the motor 20. Generally, in a DC motor such as the motor 20, the counterelectromotive force gently increases from zero during the starting of the motor so that, at the starting moment, the counterelectromotive force and current $I_M$ are zero with the transistor $Q_2$ being OFF and the output terminal 21 outputting a voltage substantially equal to the power source voltage Vcc. The voltage produced at the output terminal 21 becomes the output terminal potential Vb which is an input voltage applied to one input terminal of the comparator circuit 26. On the other hand, the reference voltage Va which is an input voltage applied to the other input terminal of the comparator circuit 26 becomes lower than the input terminal potential Vb due to the function of the reference voltage generating circuit 25.

As explained above, during the starting of the motor 20, since the reference voltage potential Va becomes $\{Vcc-(V_R+Vr)\}$ with the output terminal potential Vb being about the same as the power source voltage Vcc, the difference between the reference voltage potential Va and the output terminal potential Vb becomes large. Due to such an increase in the potential differences between the reference voltage potential Va and the output terminal potential Vb, the transistor $Q_2$ in the symmetric current circuit 28 becomes conductive and, thus, the motor 20 starts rotating due to the current which flows from the collector to the emitter of the transistor $Q_2$.

On the other hand, during the maximum driving state of the transistor $Q_2$, the potential $V_1$ at the reference voltage input terminal 22 drops to $V_{1min}$ which is determined by the circuit configuration of the control circuit 23. Consequently, since the current $I_M$ flowing to the motor upon starting is proportional to a portion of the current flowing to the control circuit 23, the maximum value $I_{1max}$ of the total current $I_1$ flowing through the resistor R and the maximum value $Ic_{max}$ of the current Ic flowing to the collector of the transistor $Q_1$ may thus be expressed by the following Equations 1 and 2, respectively.

$$I_{1max}=(Vcc-V_{1min})/R=Icc+Ic_{max}+Is \quad (1)$$

$$Ic_{max}=(Vcc-V_{1min})/R \quad (2)$$

Here, since $I_{1max}>>I_2$, $Ic_{max}>>Icc+Is$, and $I_M=-K\cdot Ic$, the starting current of the motor may be expressed by the following Equation 3:

$$I_{Mmax}=K\cdot(Vcc-V_{1min})/R \quad (3)$$

Here, the current Ic flowing to the collector of the transistor $Q_1$ is of a value proportional to the current $I_M$ flowing to the motor which is the current flowing to the collector of the transistor $Q_2$.

As described above and shown in FIG. 3C, during the starting of the motor 20, the reference voltage potential Va applied to the comparator circuit 26 becomes lower than the output terminal potential Vb also applied to the comparator circuit 26.

In the conventional motor driving circuit described above, one of the problems is that, since the starting current characteristics of the motor are determined by the configuration of the motor driving circuit, sufficient starting torque cannot be obtained during the starting operation of the motor. This is a problem to be solved by the invention, in the conventional motor driving circuit.

SUMMARY OF THE INVENTION

It is, therefore, an object of the present invention to overcome the problems existing in the conventional circuit and to provide an improved motor driving circuit in which motor speed is controlled by a current controlled method using negative impedance and which achieves sufficient starting torque.

According to one aspect of the invention, there is provided a motor driving circuit comprising:

a reference voltage generating circuit for outputting an output voltage of a value derived from addition of a reference voltage and a voltage proportional to a value of a current flowing to a motor;

a comparator circuit which receives at a first input terminal the output voltage from the reference voltage generating circuit and at a second input terminal a motor driving output voltage;

an output driving circuit for amplifying an output from the comparator circuit;

a symmetric current circuit having a first and a second output terminal, for amplifying an output from the output driving circuit and outputting the motor driving output voltage through the second output terminal; and a switching circuit in which, during normal state of operation, the first output terminal of the symmetric current circuit is caused to be connected to an input terminal of the reference voltage generating circuit, and during specific state of operation, the first output terminal of the symmetric current circuit is caused to be connected to the second input terminal of the comparator circuit.

In the motor driving circuit according to the present invention in which motor speed is controlled by a current controlled method using negative impedance, the switching circuit functions such that, under normal operation, the first output terminal of the symmetric current circuit is electrically connected to the input terminal of the voltage reference circuit so as to control the current to the motor in order to bring the motor to the constant speed control state but, under the specific state of operation, the first output terminal of the symmetric current circuit is connected to the second input terminal of the comparator circuit so as to release the motor from the constant speed control state of normal operation and to release also the control of the current flowing to the motor. Therefore, in the motor driving circuit according to the present invention, it is possible to achieve sufficient starting torque by causing the motor to be set in a non-constant speed control state during the starting operation of the motor. Also, since the motor can be set to the non-constant speed control state at any desired time, the torque of the motor can be increased as desired at any time.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, embodiments according to the invention are explained with reference to the drawings.

Figure 4:
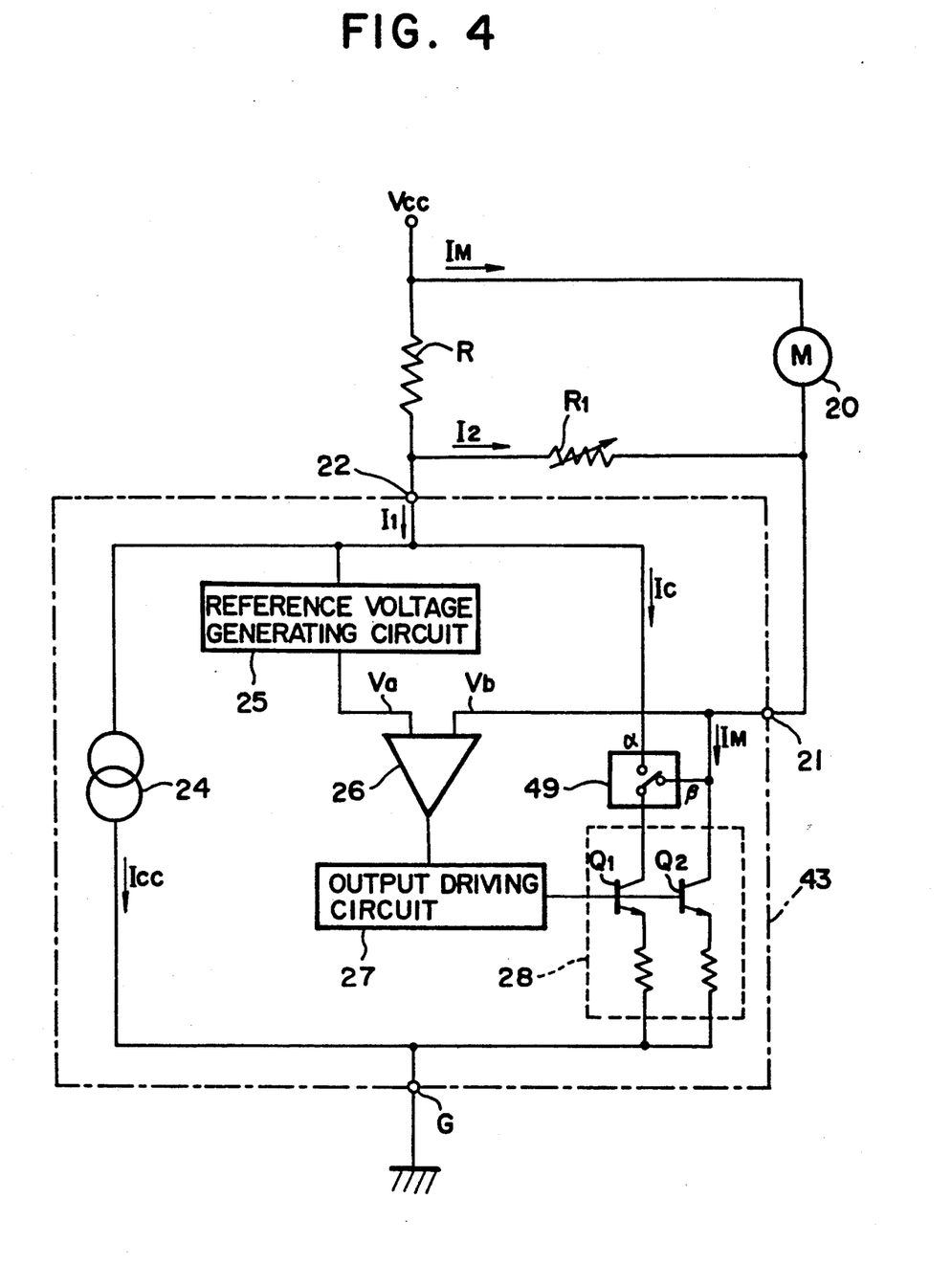
FIG. 4 is a circuit diagram showing a first embodiment of the motor driving circuit according to the present invention.

FIG. 4 is a circuit diagram showing a first embodiment of a motor driving circuit according to the invention. In FIG. 4, reference numerals having the same numerals are used for the same elements in the conventional driving circuit shown in FIG. 2 and the repletion of the same explanation is omitted herein.

As shown in FIG. 4, the motor driving circuit according to the first embodiment includes a control circuit 43 blocked in dashed lines, a resistor R and a variable resistor R1. The control circuit 43 is constituted by a constant-current circuit 24, a reference voltage generating circuit 25, a comparator circuit 26, an output driving circuit 47, a symmetric current circuit 48 and a switching circuit 49. The symmetric current circuit 28 is constituted by a current mirror circuit having a transistor $Q_1$ and a transistor $Q_2$. The structural difference herein from the conventional motor driving circuit shown in FIG. 2 resides in a portion wherein the switching circuit 49 is provided between the collector of the transistor $Q_1$ and the reference voltage input terminal 22.

Next, the operation of the motor driving circuit according to the first embodiment arranged as above is explained. First, under normal operation, the switching circuit 49 is switched to the α-side terminal thereby causing the symmetric current circuit 28 to be driven and the motor 20 to be driven by means of a current control method. The operation at this time is the same as that in the conventional motor driving circuit shown in FIG. 2.

Figure 5A:
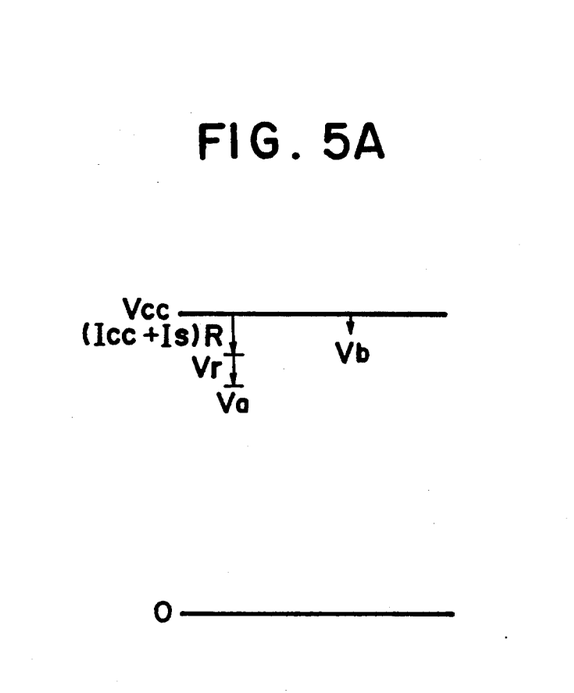
FIGS. 5A and 5B are explanatory diagrams showing the relationship between potentials at various points of the motor driving circuit shown in FIG. 4.

FIG. 5A shows the relationship between potentials at various points of the control circuit 43 during the starting operation of the motor 20. Upon starting the motor 40, lo the output terminal 21 has a potential substantially equal to the power supply voltage Vcc. The potential at the output terminal 21 is applied to the one input terminal of the comparator circuit 26 as the output terminal potential Vb. Also, the reference voltage potential Va which is the potential applied to the other input terminal of the comparator circuit 26 becomes a potential lower than the output terminal potential Vb due to the voltage reference circuit 25. At this time, since the reference voltage potential Va comes $\{Vcc-(V_R+Vr)\}$ and the output terminal potential Vb becomes substantially equal to the power source voltage Vcc, the difference between the reference voltage potential Va and the output terminal potential Vb becomes large.

Figure 5B:
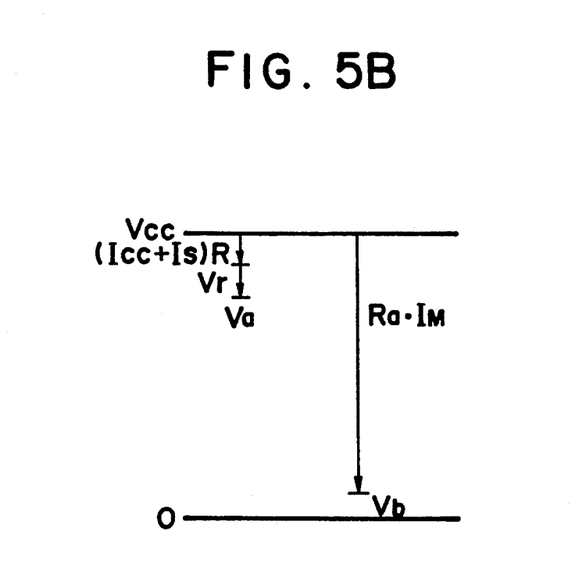

Then, when the switching circuit 49 is switched to the β-side terminal, the symmetric current circuit 28 does not function as a current mirror circuit any longer and, to the output terminal 21, there is a large flow of current which is determined by the transistor saturation resistance of the symmetric current circuit 28 with the transistors $Q_1$ and $Q_2$ being connected in parallel. That is, as shown in FIG. 5B, when the switching circuit 49 is switched to the β-side terminal, since the current Ic proportional to the current $I_M$ to the motor becomes zero, the control circuit 43 turns to a non-control state and gives no restriction to the current $I_M$ to the motor, so that there is a flow of the current $I_M$ to the motor which is determined only by the characteristics of the transistors $Q_1$ and $Q_2$.

As the motor driving circuit of the first embodiment is arranged as above, it is possible to have a sufficient driving current supplied to the motor and to attain a sufficient starting torque.

Figure 6:
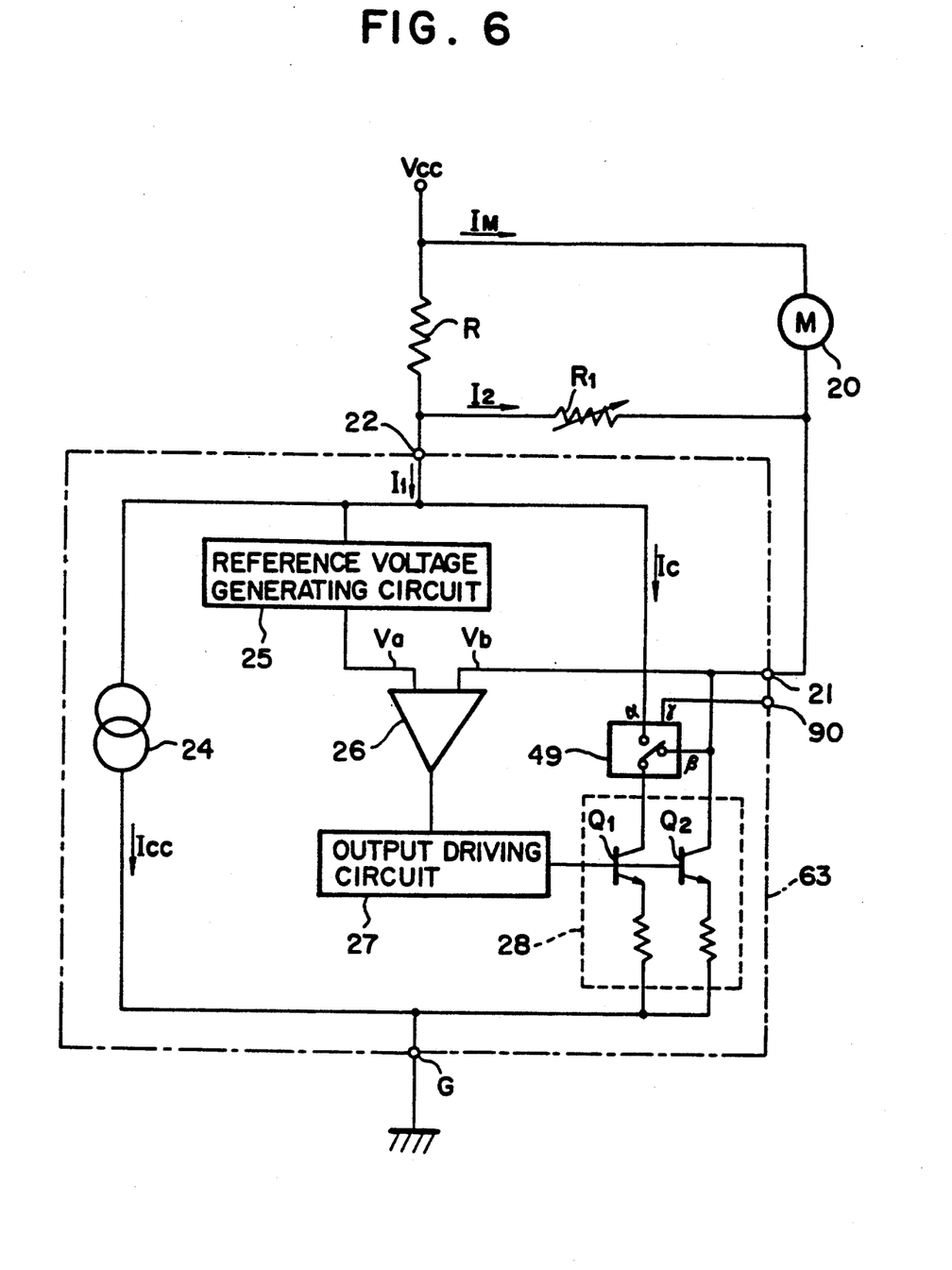
FIG. 6 is a circuit diagram showing a second embodiment of the motor driving circuit according to the present invention.

FIG. 6 is a circuit diagram of a motor driving circuit of a second embodiment according to the invention. The same reference numerals are used for the same elements as FIG. 4 structural difference between this second embodiment and the first embodiment of FIG. 4 resides in a portion wherein a switching circuit 49 of a control circuit 63 is controlled by a signal inputted externally thereto. The control terminal γ of the switching circuit 49 is connected to a switching circuit control terminal 90.

In the circuit of this second embodiment as arranged above, since the switching circuit 49 is controlled externally thereof, it is possible to obtain a high torque when so desired and it is also possible to keep the motor speed constant when so desired. It is thus possible to effect a sudden increase in a motor speed at any time, so that the circuit is suitable for application such as controlling fast rewinding of reeled tapes. Furthermore, the switching circuit 49 may be constituted by active elements such as bipolar transistors and MOS transistors. Also, in the motor driving circuit of the second embodiment, the saturation resistance of the transistors can be reduced due to the transistors $Q_1$ and $Q_2$ operating in parallel and, thus, it is possible to increase the maximum value of the motor driving current.

External devices to be connected to the switching circuit control terminal 90 may be, for example, a tachometer generator which detects a rotation speed of the motor and a microcomputer which stores information in advance as to the initial conditions required.

Figure 7:
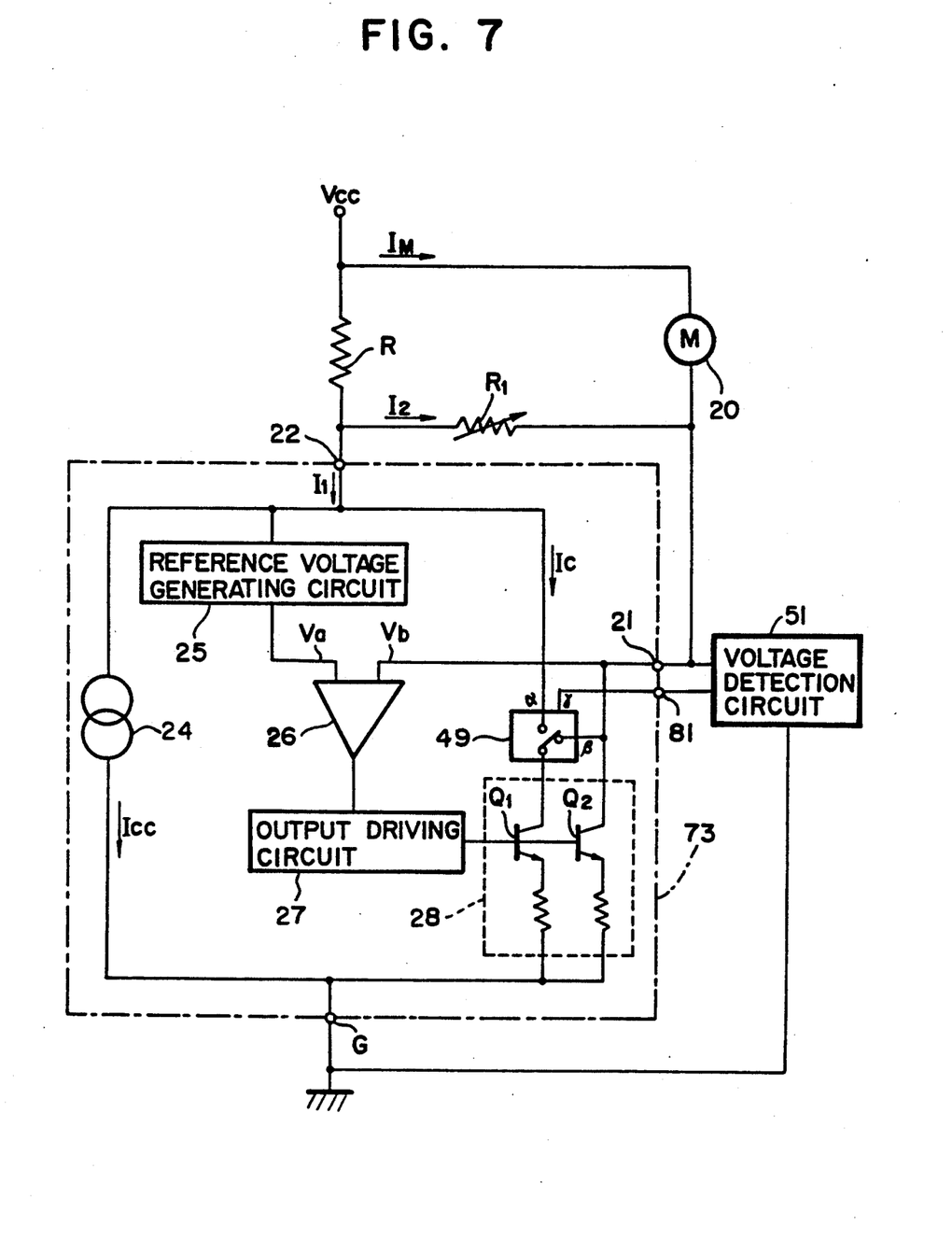
FIG. 7 is a circuit diagram showing a third embodiment of the motor driving circuit according to the present invention.

FIG. 7 is a circuit diagram of a motor driving circuit of a third embodiment according to the invention. The same reference numerals are used for the same elements as in the embodiments of FIGS. 4 and 6. The difference in the arrangements between third embodiment and the second embodiment resides in a portion wherein a voltage detecting circuit 51 is connected to the output terminal 21 of the control circuit 23 and the switching circuit control terminal 81. The voltage detecting circuit 51 detects the potential of the output terminal 21 and, based on the detected potential, controls the switching circuit 49 of the control circuit 73. Because of the arrangements as above in the circuit of the third embodiment, the motor driving torque can be increased in proportion to an increase in the potential at the output terminal 21, that is, the load to the motor 20.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A motor driving circuit comprising:
   a reference voltage generating circuit for outputting an output voltage of a value derived from addition of a reference voltage and a voltage proportional to a value of a current flowing to a motor;
   a comparator circuit which receives at a first input terminal the output voltage from said reference voltage generating circuit and at a second input terminal a motor driving output voltage;
   an output driving circuit for amplifying an output from said comparator circuit;
   a symmetric current circuit having a first and a second output terminal, for amplifying an output from said output driving circuit and outputting said motor driving output voltage through said second output terminal; and
   a switching circuit in which, during normal state of operation, the first output terminal of said symmetric current circuit is caused to be connected to an input terminal of said reference voltage generating circuit, and during specific state of operation, the first output terminal of said symmetric current circuit is caused to be connected to the second input terminal of said comparator circuit.

2. A motor driving circuit according to claim 1, further comprising a switching circuit control terminal and in which said switching circuit is connected to said switching circuit control terminal in order to be controlled by a signal applied externally of said switching circuit.

3. A motor driving circuit according to claim 2, further comprising a voltage detecting circuit, and in which said voltage detecting circuit is connected to said switching circuit control terminal and said control circuit output terminal thereby to detect a potential of said control circuit output terminal for controlling said switching circuit.

4. A motor driving circuit according to claim 1, in which said symmetric current circuit is a current mirror circuit formed by two bipolar transistors receiving at their base electrodes commonly the output from said output driving circuit.

* * * * *